V. HENRI, A. HELBRONNER & M. VON RECKLINGHAUSEN.
APPARATUS FOR THE TREATMENT OF WATER AND OTHER LIQUIDS BY ULTRA-VIOLET RAYS.
APPLICATION FILED NOV. 10, 1913.

1,140,819.   Patented May 25, 1915.

WITNESSES:
Wm Bohleber
Hugo B. Olson

INVENTORS:
Victor Henri
André Helbronner
Max von Recklinghausen
By Hero Page Cooper & Hayward

UNITED STATES PATENT OFFICE.

VICTOR HENRI, OF PARIS, AND ANDRÉ HELBRONNER AND MAX VON RECKLINGHAUSEN, OF SURESNES, FRANCE, ASSIGNORS, BY MESNE ASSIGNMENTS, TO THE R. U. V. COMPANY, INC., A CORPORATION OF NEW YORK.

APPARATUS FOR THE TREATMENT OF WATER AND OTHER LIQUIDS BY ULTRA-VIOLET RAYS.

1,140,819.     Specification of Letters Patent.     Patented May 25, 1915.

Original application filed October 31, 1910, Serial No. 589,995. Divided and this application filed November 10, 1913. Serial No. 800,048.

*To all whom it may concern:*

Be it known that we, VICTOR HENRI, a citizen of the French Republic, residing at Paris, France, ANDRÉ HELBRONNER, a citizen of the French Republic, residing at Suresnes, France, and MAX VON RECKLINGHAUSEN, a subject of the German Emperor, residing at Suresnes, France, have invented a new and useful Improvement in Apparatus for the Treatment of Water and other Liquids by Ultra-Violet Rays, of which the following is a specification, this application being a division of application Serial No. 589,995, filed October 31, 1910.

This invention relates to the treatment of liquids by means of ultra-violet rays and particularly to the treatment of such liquids as are only slightly or not at all opaque to the rays and has for its object the construction of improved apparatus suitable for this purpose.

In treating liquids by ultra-violet rays it is obviously desirable for economical reasons to utilize all the rays emanating from the source and for this purpose it has already been suggested to immerse the source of rays, a mercury vapor electric lamp having a container of quartz for example, in the liquid to be treated. This procedure while attaining a useful object is objectionable for the reason that the source of rays may be unduly cooled by being brought in contact with the liquid to be treated and furthermore deposits of salts are formed on the containing envelop which prevent the passage of the rays and thereby reduce the efficiency of the apparatus.

According to the present invention we provide an improved apparatus in which the source of ultra-violet rays is entirely surrounded by liquid to be treated, said liquid, however, being prevented from coming into contact with the source of rays which is enveloped by a layer of air.

In the accompanying drawing is shown the apparatus devised for carrying out this invention.

Figure 1:
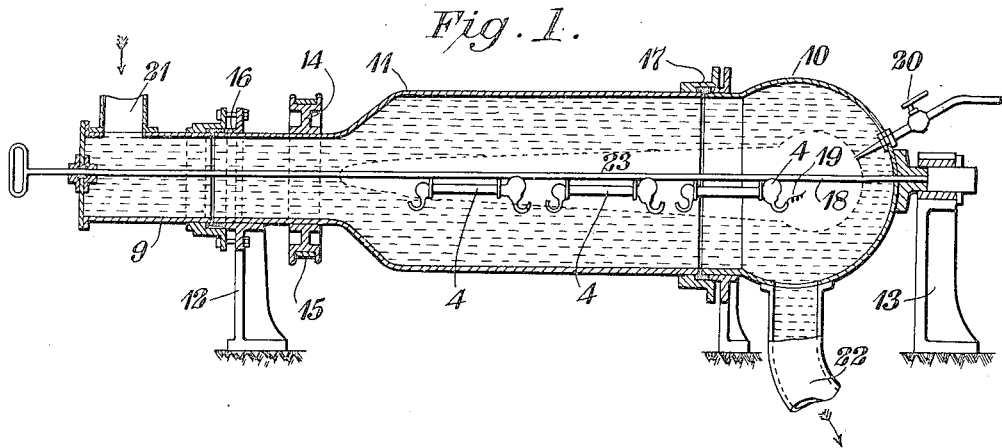
Figure 2:
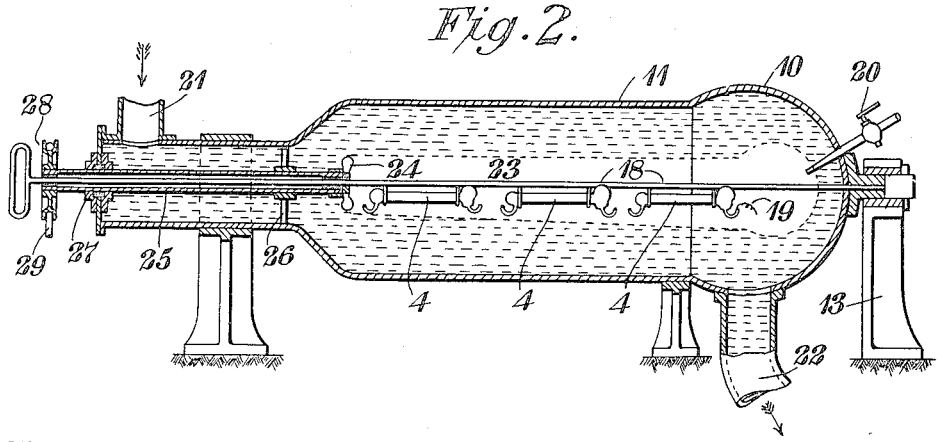

Figure 1 is a central longitudinal section of the said device and Fig. 2 is a similar view of a modified form of the same.

The treating vessel is in general form cylindrical, and is composed of a central rotating portion 11 mounted in water tight bearings in the two end chambers 9 and 10, the whole forming a conduit for containing a liquid which is to be sterilized, and passing it by a source of ultra-violet rays.

A shaft 18 passes entirely through this chamber and affords a support for one or more mercury vapor lamps 4, which are typical illustrations of a source of ultra-violet rays, and which are supplied by a current through terminal wires 19, which may be led from the apparatus in any proper manner.

The several parts of the device are mounted on supports as 12 and 13, and the connections between the central rotating and the stationary end portions are shown at 16 and 17. The central portion 11 is provided with a pulley 14 which is driven by a belt 15.

When the device is operating, the fluid to be sterilized is introduced at 21 until the chamber is practically full, and allowed to flow off at 22. As soon as the requisite quantity of fluid is received in the chamber the central part is rotated, which results in imparting to the entire mass of liquid a whirling or rotating motion. This will result in the formation of a vacant space or cavity 23 around the lamps or lamp 4 by centrifugal action, and the liquid will continue to flow through the chamber from inlet to outlet while preserving this form. The liquid, therefore, while not touching the lamps will pass by them and will be sterilized by their rays, and, by the movement of the fluid which brings all portions of the liquid into direct contact with the rays, this result will be accomplished quickly and thoroughly. As the air pressure in the cavity 23 is somewhat reduced, only a small proportion of the effective rays will be absorbed by the air.

In order to increase the size of the cavity 23 or to produce a cavity of desired dimensions with a lower speed of rotation, air can be admitted through the controllable cock 20, if necessary.

In the modification shown in Fig. 2 the treating vessel is stationary and the rotary movement is imparted to the liquid by means of a propelling wheel 24 the hollow shaft of which is supported in bearings 26 and 27, and driven by means of the pulley 28 and belt 29. The rod 18 which supports the lamp or lamps 4 passes through the hollow shaft 25 of the propeller wheel. When the latter is rotated a cavity 23 is formed in the liquid, the dimensions of which may be varied by altering the speed of the propeller wheel or by the admission of air through the inlet 20.

By giving a suitable shape to the vessel and causing the liquid to rotate at the correct speed the cavity may be made to assume a shape approximately the same as that of the source of ultra-violet rays so that the inclosing walls of liquid may be equidistant from the source.

The apparatus illustrated is intended for the purpose of sterilizing water but the invention is generally applicable for the treatment of liquids by ultra-violet rays for any purpose for which such treatment may be desirable or useful.

In all the arrangements illustrated it will be observed that the liquid while undergoing treatment is very considerably agitated, this adds to the efficiency of the apparatus, as it insures that every part of the liquid shall come under the influence of the rays, this being especially important when the liquid, as is often the case, holds solid matter in suspension.

It will be understood that the forms of construction shown are illustrative of suitable embodiments of our invention and that we do not limit ourselves to such forms except in so far as limitations are imposed by the appended claims.

We claim as our invention:—

1. In apparatus for treating liquids, the combination with a closed horizontal treating chamber adapted to be filled with the liquid under treatment, a source of ultra-violet rays at the horizontal axial center of said chamber, and means for imparting to the liquid a rotary movement within the chamber about such center, whereby a cavity is formed in the body of the liquid by centrifugal action, in which is contained the source of rays.

2. In apparatus for treating liquids, the combination with a closed horizontal treating chamber, adapted to be filled with the liquid under treatment, a portion of said chamber being capable of rotation about a horizontal axis, a source of ultra-violet rays at the axial center of the rotary portion, and means for driving said rotary portion, whereby a cavity will be formed by centrifugal action around the source of rays.

3. In apparatus for treating liquids, the combination with a closed horizontally extended treating chamber, adapted to contain the liquid to be treated, a source of ultra-violet rays at the axial center of said chamber, means for producing a rotary movement of the liquid about a horizontal axis within the chamber, and, by centrifugal action, a cavity at the axial center thereof, and means for controlling the admission of air, to the center of the chamber for varying the dimensions of such cavity, as set forth.

In testimony whereof we have hereunto subscribed our names this tenth day of May 1913.

VICTOR HENRI.
ANDRÉ HELBRONNER.
MAX von RECKLINGHAUSEN.

Witnesses:
JOHN BAKER,
HANSON C. COXE.